(12) United States Patent
Tsurumi (10) Patent No.: US 7,553,036 B2
(45) Date of Patent: Jun. 30, 2009

(54) DISPLAY DEVICE (75) Inventor: Shunya Tsurumi, Chiryu (JP)

(73) Assignee: Denso Corporation, Kariya (JP)

( * ) Notice: Subject to any disclaimer, the term of this patent is extended or adjusted under 35 U.S.C. 154(b) by 225 days.

(21) Appl. No.: 11/705,602

(22) Filed: Feb. 13, 2007

(65) Prior Publication Data
US 2007/0186843 A1   Aug. 16, 2007

(30) Foreign Application Priority Data
Feb. 15, 2006   (JP) .............................. 2006-038491

(51) Int. Cl.
*G01D 11/28* (2006.01)
(52) U.S. Cl. .............................. 362/23; 362/28; 362/29
(58) Field of Classification Search .................. 362/23, 362/28–30, 489, 85; 116/48, 49, 286–288, 116/310; 359/436, 439
See application file for complete search history.

(56) References Cited
U.S. PATENT DOCUMENTS
4,775,964 A * 10/1988 Alessio et al. ................ 368/67
5,741,058 A * 4/1998 Suzuki et al. ................ 362/27
6,966,663 B2 * 11/2005 Wada et al. ................... 362/29

FOREIGN PATENT DOCUMENTS
JP   2003-247871   9/2003
JP   2004-184221   7/2004

* cited by examiner

*Primary Examiner*—Bao Q Truong
(74) *Attorney, Agent, or Firm*—Nixon & Vanderhye, PC (57) ABSTRACT

A display device includes a translucent member having a scale part, a light source disposed at a rear side of the translucent member and a dial plate. The dial plate has a shield part that is located to shield a first portion of the scale part from a visual side so as to be invisible from the visual side when the light source is off. The scale part has a second portion that is a residual portion of the first portion, and the second portion is visible from the visual side when the light source is off. The shield part has a translucency so that the first portion of the scale part is visible through the shield part when the light source is on.

14 Claims, 8 Drawing Sheets

DISPLAY DEVICE

CROSS REFERENCE TO RELATED APPLICATION

This application is based on Japanese Patent Application No. 2006-38491 filed on Feb. 15, 2006, the contents of which are incorporated herein by reference in its entirety.

BACKGROUND OF THE INVENTION

1. Field of the Invention

The present invention relates to a display device which is suitably used as an indicating instrument for an automobile.

2. Description of the Related Art

A vehicular indicating instrument built in an automobile is desired to have a sense of spatial expanse in visual to improve its appearance.

For example, JP-A-2003-247871 discloses an indicating instrument that includes a first dial plate, a second dial plate disposed at a visual side of the first dial plate, an indicator rotating along a front face of the second dial plate on the visual side, a light emitting diode disposed behind the first dial plate and a half mirror disposed between the first dial plate and the second dial plate. The first dial plate and the second dial plate have translucencies. Scales are formed in the first dial plate and characters are formed in the second dial plate. When the light emitting diode does not emit light, the half mirror becomes a mirror state. Therefore, the scales of the first dial plate are invisible from the visual side due to the mirror-stated half mirror.

On the other hand, when the light emitting diode emits light, the half mirror has a translucency, and the light of the light emitting diode that has been permeated through the first dial plate permeates and illuminates the half mirror and the second dial plate. In this way, the scales of the first dial plate are visible from the visual side.

In the other words, when the light emitting diode does not emit light, only the characters of the second dial plate are visible. However, the light emitting diode emits light, both the characters of the second dial plate and the scales of the first dial plate at the rear side of the second dial plate are visible. This changes the display of the indicating instrument and permits to obtain a novel appearance with a sense of space and depth for occupants.

In the indicating instrument according to JP-A-2003-247871, the sense of spatial expanse is available to be felt by the occupants due to the change of the display. However, there is no sense of spatial connection between the scales and the characters, so the sense of spatial connection in the change of the display of the indicating instrument is not available. For this reason, the appearance of the indicating instrument cannot be improved enough.

SUMMARY OF THE INVENTION

In view of the foregoing problems, it is an object of the present invention to provide a display device in which both the sense of spatial connection and the sense of spatial expanse can be improved.

A display device according to an aspect of the invention includes a translucent member having a scale part, a light source disposed at a rear side of the translucent member and a dial plate. The dial plate has a shield part that is located to shield a first portion of the scale part from a visual side so as to be invisible from the visual side when the light source is off. The scale part has a second portion that is a residual portion of the first portion, and the second portion is visible from the visual side when the light source is off. The shield part has a translucency so that the first portion of the scale part is visible through the shield part when the light source is on.

Therefore, only the second portion of the scale part is visible when the light source is off, and both the first portion and the second portion are visible when the light source is on. Thus, a display of the scale part changes between the condition that only the second portion is visible and the condition that both the first portion and the second portion are visible depending on switching on/off of the light source.

As a result, the display device is provided to have the sense of spatial connection and the sense of spatial expanse in the change of the display of the scale part.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

A display device according to an embodiment of the invention is described with reference to FIGS. 1-4.

A combination meter 1 which is a display device (e.g., an indicating instrument) is arranged in front of a driver seat of an automobile and displays various information on the automobile.

Figure 1:
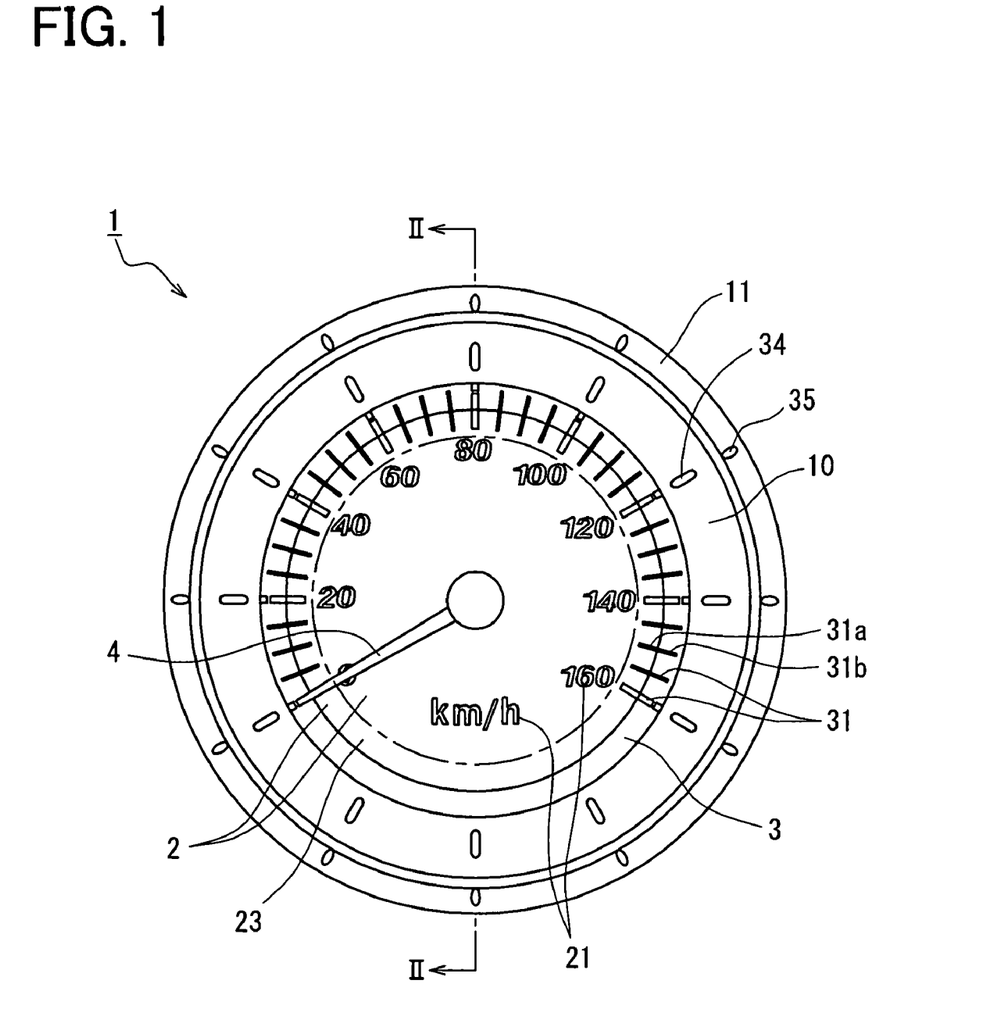
FIG. 1 is a front view of a combination meter which is a display device according to an embodiment of the invention.
Figure 2:
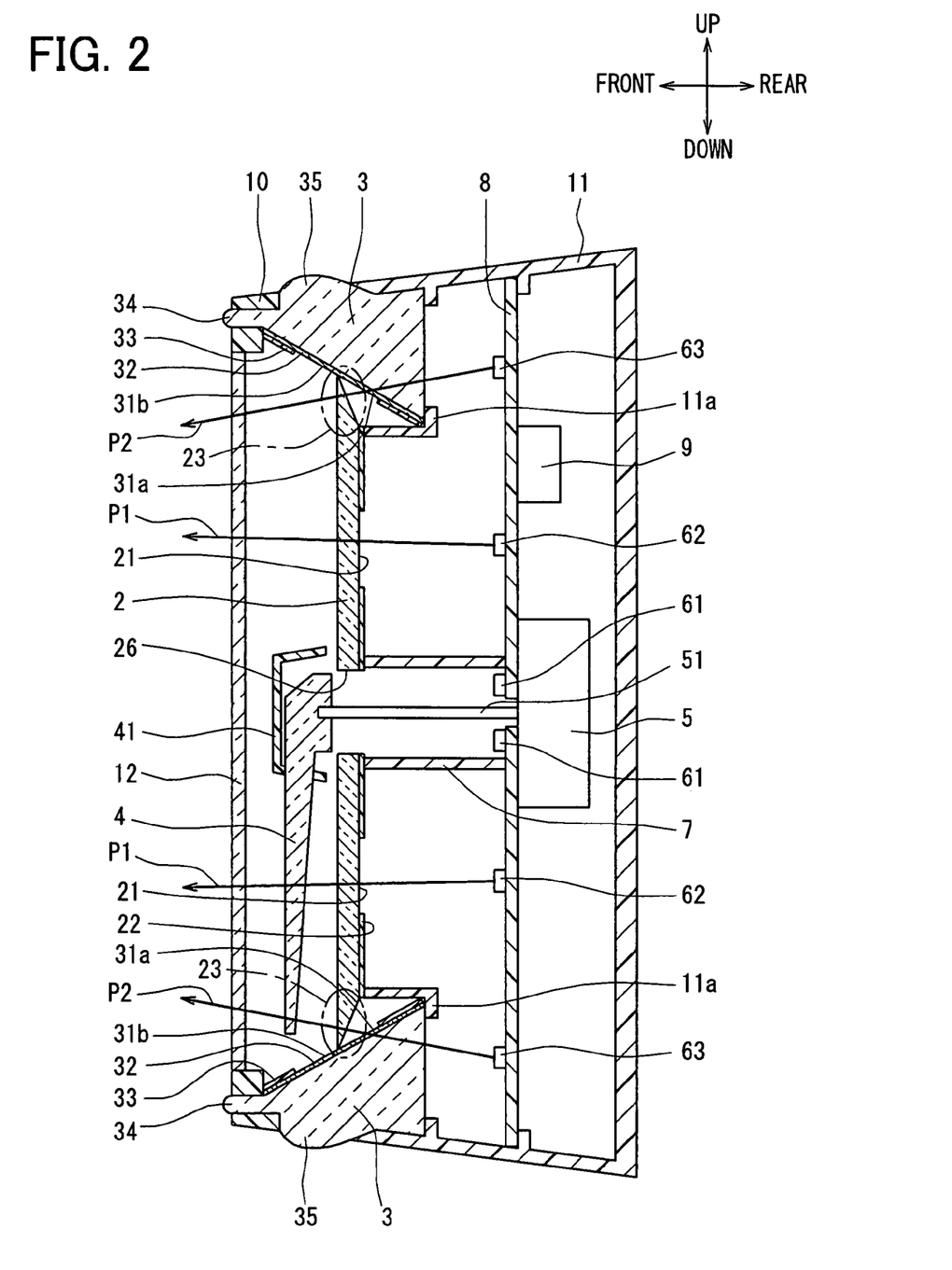
FIG. 2 is a cross-sectional view of the display device taken along line II-II in FIG. 1.

The combination meter 1 includes a speed meter displaying a vehicle running velocity as shown in FIG. 1, and the speed meter is located to be viewable for a driver. The speed meter includes a dial plate 2 in which a character part 21 is formed, a scale ring 3 made of a translucent material and in which a scale part 31 is formed, and an indicator 4 turning along a front face of the dial plate 2 on the visual side as shown in FIG. 2.

The dial plate 2 is formed to have a smoky glass property. Specifically, the dial plate 2 is formed into a plate shape to be smoky like a smoky glass and have a translucency. For example, the dial plate 2 is formed from a material prepared by mixing a transparent and colorless material such as resin with light diffusible fine powder. A black and light-shielding background layer 22 is formed on a rear face of the dial plate 2 as a background part of the character part 21 as shown in FIG. 2. Apertures of the background layer 22 are formed to be used as the character part 21. The background layer 22 is formed by a method such as hot stamping or printing.

A shield part 23 is formed into a ring shape along an outer peripheral side of the dial plate 2 as shown in FIG. 1. The shield part 23 has a ring shape along a rotation direction of an end of the indicator 4. As shown in FIG. 2, the shield part 23 is formed into a wedge shape in cross section so that a thickness thereof (a dimension of front-and-rear direction in FIG. 2) becomes thinner toward the outer peripheral direction.

Because the dial plate 2 including the shield part 23 is formed to have the smoky glass property, a translucency of the shield part 23 formed into the wedge shape gradually increases toward the outer peripheral direction. This allows the shield part 23 to make a graduation part in which a translucency thereof gradually increases.

In addition, a smoky level of the dial plate 2 including the shield part 23 is controlled so that the character part 21 and a first portion 31a of the scale part 31 (an inner peripheral region in FIG. 1 and a rear side region in FIG. 2) are invisible from the visual side (a front side in FIG. 2) through the dial plate 2 when a light emitting diode 63 does not emit light. The smoky level of the dial plate 2 is also controlled so that the character part 21 and the first portion 31a of the scale part 31 are visible from the visual side through the dial plate 2 when the light emitting diode 63 emits light.

In other words, the smoky level of the dial plate 2 including the shield part 23 is controlled so that displays of the character part 21 and the first portion 31a of the scale part 31 can change depending on on/off state of the light emitting diode 63.

Furthermore, the background layer 22 is not provided on a rear face of the shield part 23 (a gradient part of the wedge shape in FIG. 2).

The scale ring 3 is formed into a ring shape from a transparent and colorless material such as acrylic resin. A white and translucent scale layer 32 is formed on a front face of the scale ring 3 and a black and light-shielding background layer 33 is formed on a front face of the scale layer 32 as a background part of the scale part 31 as shown in FIG. 2. The scale part 31 is formed so that the scale layer 32 is visible through apertures of the background layer 33. The scale layer 32 and the background layer 33 are formed respectively, by a method such as hot stamping and printing.

The scale part 31 is formed along the rotation direction of the end of the indicator 4 and is also formed to be inclined relative to the dial plate 2 including the shield part 23.

The first portion 31a of the scale part 31 is arranged to be shielded from the visual side (the front side in FIG. 2) by the shield part 23 of the dial plate 2. A second portion 31b of the scale part 31 (an outer peripheral region of the first portion 31a in FIG. 1) is arranged at the visual side than the first portion 31a to be forward of the dial plate 2. Each of the scales of the scale part 31 continuously extends from the first portion 31a of the scale part 31 to the second portion 31b of the scale part 31 as shown in FIG. 1.

Although the dial plate 2 is not provided at an outer peripheral side over the shield part 23, this is not limited. The dial plate 2 can have an aperture part to allow the second portion 31b of the scale part 31 to be forward of the dial plate 2.

The dial plate 2 has a through-hole 26 for insertion of a shaft 51 of a movement 5. The movement 5, light emitting diodes 61-63, a supporting member 7, a printed board 8, and a control device 9 including a microcomputer are arranged at a rear side of the dial plate 2 and the scale ring 3. The printed board 8 forms an electrical circuit part of a speed meter, and the movement 5, the light emitting diodes 61-63 and the control device 9 are mounted on the printed board 8.

The movement 5 includes, for example a crossed coil actuator and a stepping motor, and rotates the shaft 51 by an angle in accordance with outside electrical signals (i.e., vehicle speed signals in the present embodiment). The shaft 51 extends to the front side in FIG. 2 through the through-hole 26 of the dial plate 2, and the indicator 4 is fixed at an end of the shaft 51.

An illumination room that leads a light (e.g., a white light) from the light emitting diode 61 is formed inside the supporting member 7 of the dial plate 2. The indicator 4 is made of a translucent material such as acryl resin, and a red layer is formed on a front face of the indicator 4 to be lighted in red when the white light of the light emitting diode 61 illuminates the indicator 4.

A light-shielding cap 41 is made of a light-shielding black material such as resin and prevents the white light of the light emitting diode 61 from coming directly in eyes of a viewer.

A light (e.g., a white light) from the light emitting diode 62 permeates and illuminates the dial plate 2, and a light (e.g., a white light) from the light emitting diode 63 enters in the scale ring 3 and permeates and illuminates the scale part 31.

A case that houses those components includes a front case 10, a rear case 11 and a transparent cover 12. The supporting part 11a is formed in the rear case 11. The scale ring 3 is held between the front case 10 and the supporting part 11a of the rear case 11 to be fixed to the front case 10 and the supporting part 11a. In addition, the front case 10 and the rear case 11 are made of a light-shielding black material such as resin, and the transparent cover 12 is made of a transparent and colorless material such as resin.

The scale ring 3 has first salients 34 and second salients 35. The first salients 34 insert through apertures of the front case 10 to project to a visual side of the front case 10 as shown in FIG. 2. The second salients 35 are held between the front case 10 and the supporting part 11a of the rear case 11 to project to an outer peripheral side of the rear case 11. The first salients 35 and the second salients 36 decorate the scale part 31 from the outer peripheral side of the dial plate 2 as shown in FIG. 1.

Figure 3:
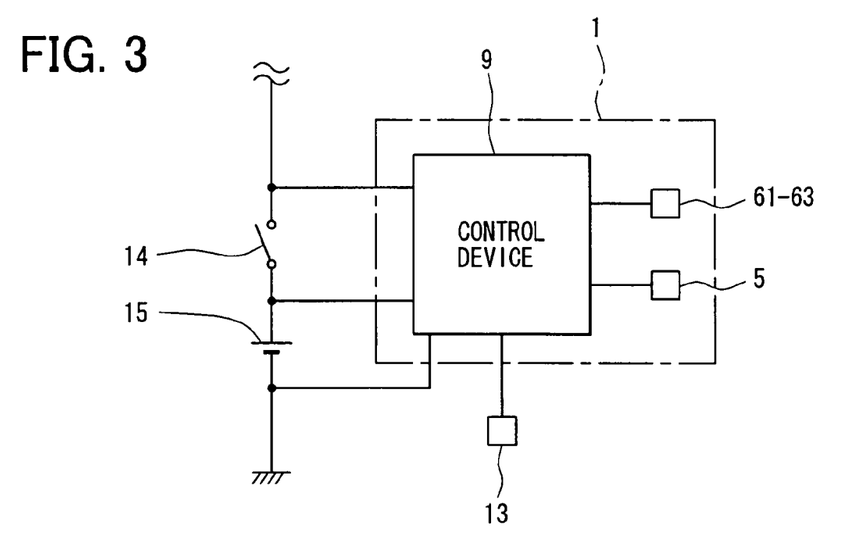
FIG. 3 is a circuit diagram showing an electric circuit of the combination meter according to the embodiment of the invention.

The electrical circuit of the combination meter 1 according to the present embodiment will be now described based on FIG. 3.

The control device 9 is constantly supplied with an electric power from a battery 15. The control device 9 is connected with an ignition switch 14 so that the control device 9 can detect a control position (off position and on position) of the ignition switch 14. The control device 9 is also connected with a vehicle speed sensor 13 that detects a vehicle speed so that the vehicle speed sensor 13 can input a signal to the control device 9.

Furthermore, the movement 5 driven by the control device 9 according to a detecting signal from the vehicle speed sensor 13 and the light emitting diodes 61-63 are connected with the control device 9.

An operation of the combination meter 1 according to the present embodiment and having the above-described configuration is described below.

In FIG. 3, when a driver turns on the ignition switch 14, the control device 9 detects it and starts operating, has the light emitting diodes 61-63 emit light and drives the movement 5. More specifically, the control device 9 calculates the vehicle speed based on an output signal from the speed sensor 13 and drives movement 5 so that the shaft 51 rotates by an angle in accordance with the vehicle speed.

In FIG. 2, the white light of the lighted light emitting diode 61 is led by the supporting member 7, and the indicator 4 is lighted and displayed in red.

The white light of the lighted light emitting diode 62 permeates and illuminates the dial plate 2 according to a light path of an arrow P1 shown in FIG. 2. Therefore, in the dial plate 2 in FIG. 1, the characters 21 are lighted and displayed in white against the black background layer 22.

The white light of the lighted light emitting diode 63 enters in the scale ring 3 according to a light path of an arrow P2 shown in FIG. 2, displays the scale part 31 in white and permeates the shield part 23 having the translucency. Therefore, in FIG. 1, the both the first portion 31a of the scale part 31 and the second portion 31b of the scale part 31 are displayed in white against the black background layer 33. A portion of the white light of the lighted light emitting diode 63 that enters in the scale ring 3 reaches the first salients 34 and the second salients 35 and displays the salients.

As described above, the scale part 31 is formed to be inclined relative to the shield part 23 and the second portion 31b of the scale part 31 is arranged at the visual side than the first portion 31a (the front side in FIG. 2). The cross section of the shield part 23 is controlled to be smoky and is formed into the wedge shape so that the thickness thereof (the dimension of front-and-rear direction in FIG. 2) becomes thinner toward the outer peripheral direction. More specifically, the shield part 23 is formed so that the translucency thereof gradually increases from a side of the first portion 31a of the scale part 31 to a side of the second portion 31b of the scale part 31.

This makes the sense of depth in the display of the scale part 31, makes the first portion 31a of the scale part 31 gradually difficult to be visible toward a rotating center of the indicator 4 and gives a gradation effect. This allows the scale part 31 to be looked like to be extended to the rear side and to disappear to the rear side, and emphasizes a sense that the scale part 31 extends to the rear On the other hand, when the ignition switch is turned off, the light emitting diodes 61-63 do not emit light, so none of the indicator 4, the character part 21 of the dial plate 2 and the scale part 31 of the scale ring 3 are displayed.

Figure 4:
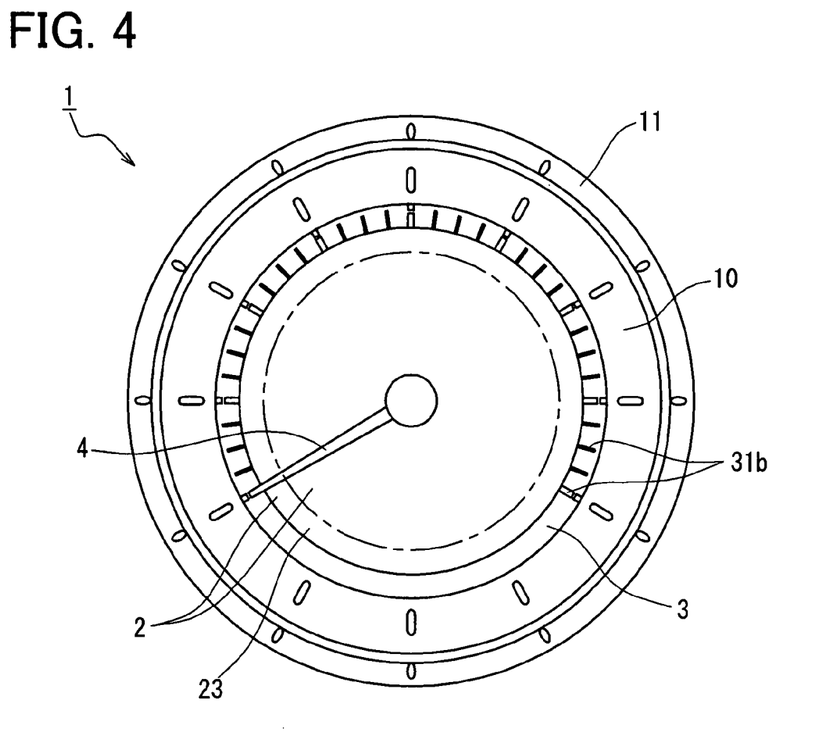
FIG. 4 is a front view of the combination meter in FIG. 1 when light emitting diodes do not emit light.

As described above, the dial plate 2 including the shield part 23 is controlled to be smoky. Therefore, as shown in FIG. 4, the character part 21 formed on the rear face of the dial plate 2 and the first portion 31a of the scale part 31 of the scale ring 3 shielded from the visual side by the shield part 23 of the dial plate 2 are invisible. However, the second portion 31b that is not shielded by the shield part 23 is visible.

Therefore, the display of the combination meter 1 changes between a displaying condition shown in FIG. 1 and a displaying condition shown in FIG. 4 by turning on/off of the ignition switch 14. Especially, the display of the scale part 31 changes between the condition that both the second portion 31b and the first portion 31a of the scale part 31 are visible as shown in FIG. 1 and the condition that only the second portion 31b of the scale part 31 is visible as shown in FIG. 4.

As a result, because of the change of the display of the scale part 31, both the sense of spatial connection and the sense of the spatial expanse are available. More specifically, when the ignition switch 14 is turned from off to on, each scale of the scale part 31 is looked like to be extended from a short length to a long length. On the other hand, when the ignition switch 14 is turned from on to off, each scale of the scale part 31 is looked like to be shrunk from the long length to the short length.

Because each of scales of the scale part 31 continuously extends from the first portion 31a of the scale part 31 to the second portion of 31b of the scale part 31, the sense of the spatial connection in the change of the display of the scale part 31 becomes higher.

In addition, because the scale part 31 is formed to be inclined relative to the shield part 23, the sense of the depth is added in the change of the display of the scale part 31 and the sense of the spatial expanse in the change of the display becomes higher.

Furthermore, because the shield part 23 is formed into the wedge shape in cross section, its gradation effect allows the scale part 31 to be looked to be extended to the rear side and to disappear to the rear side by turning on the ignition switch 14. This emphasizes the sense of the depth in the change of the display of the scale part 31 and increases the sense of the spatial expanse.

As described above, the combination meter 1 according to the embodiment of the present invention includes the scale ring 3 made of a translucent member and having the scale part 31, the light emitting diode 63 as the light source arranged at the rear side of the scale ring 3 and the dial plate 2. The dial plate 2 has the shield part 23 formed to shield the first portion 31a of the scale part 31 from the visual side so as to be invisible from the visual side when the light emitting diode 63 does not emit light. The scale part 31 has the second portion 31b that is the residual portion of the first portion 31a, and the second portion 31b is visible from the visual side when the light emitting diode 63 does not emit light. The shield part 23 has the translucency so that the first portion 31a of the scale part 31 is visible through the shield part 23 when the light emitting diode 63 emits light.

Therefore, the display device is provided to have the sense of spatial connection and the sense of spatial expanse in the change of the display.

Other Embodiments

Although the present invention has been fully described in connection with the preferred embodiment thereof with reference to the accompanying drawings, it is to be noted that various changes and modifications will become apparent to those skilled in the art.

Figure 5:
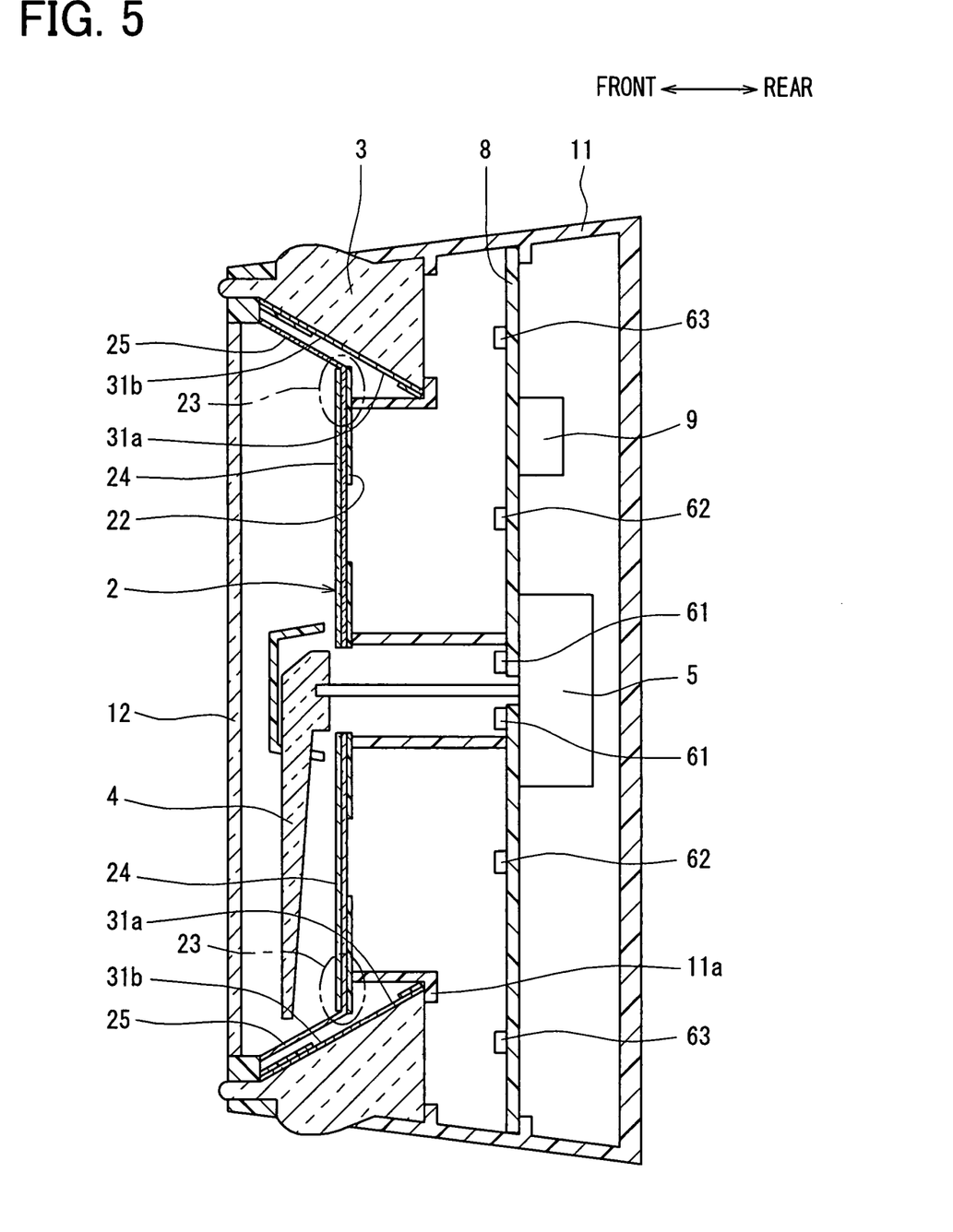
FIG. 5 is a cross-sectional view of a display device according to a first modification of FIG. 2.

For example, FIG. 5 is a cross-sectional view showing a display device according to a first modification of FIG. 2.

As shown in FIG. 5, in the first modification, the dial plate 2 includes a transparent part 25 at the visual side (a front side in FIG. 5) of the second portion 31b of the scale part 31, and a smoke layer 24 at the front face of the dial part 2 excluding the transparent part 25 unlike the above example.

The transparent part 25 is formed to be inclined along the inclined scale part 31 and has a translucency so that the second portion 31b of the scale part 31 is visible from the visual side through the transparent part 25 when the light emitting diode 63 does not emit light (when the ignition switch 14 is off). However, the transparent part 25 is not need to be limited to transparent and colorless, and enables to have some colors such as yellow.

A smoky level of the smoke layer 24 is controlled so that the first portion 31a of the scale part 31 of the scale ring 3 (the inner peripheral region in FIG. 1 and the rear side in the FIG. 5) and the character part 21 of the dial plate 2 are invisible from the visual side through the smoke layer 24 when the light emitting diodes 62 and 63 do not emit light (when the ignition switch 14 is off). The smoky level of the smoke layer 24 is also controlled so that the first portion 31a of the scale part 31 of the scale ring 3 and the character part 21 of the dial plate 2 are visible from the visual side through the smoke layer 24 when the light emitting diodes 62 and 63 emit light (when the ignition switch 14 is on). Thus, the smoky level of the smoke layer 24 is controlled so that the display of the first portion 31a of the scale part 31 and the character part 21 of the dial plate 2 can change by turning on/off of the ignition switch 14.

The smoke layer 24 is a region of the shield part 23 and is formed so that a translucency thereof gradually increases toward the outer peripheral direction, that is, from the side of the first portion 31a of the scale part 31 to the side of the second portion 31b of the scale part 31 and makes a gradation part.

The dial plate 2 is made of a transparent and colorless plate material such as polycarbonate resin. The background layer 22 is formed on the rear face of the dial plate 2. The smoke layer 24 is formed on the front face of the dial plate 2. Furthermore, the transparent part 25 is inclined by a method such as pneumatic molding and the dial plate 2 is formed.

In this way, above described effects of the embodiment are also obtained in the first modification.

Figure 6:
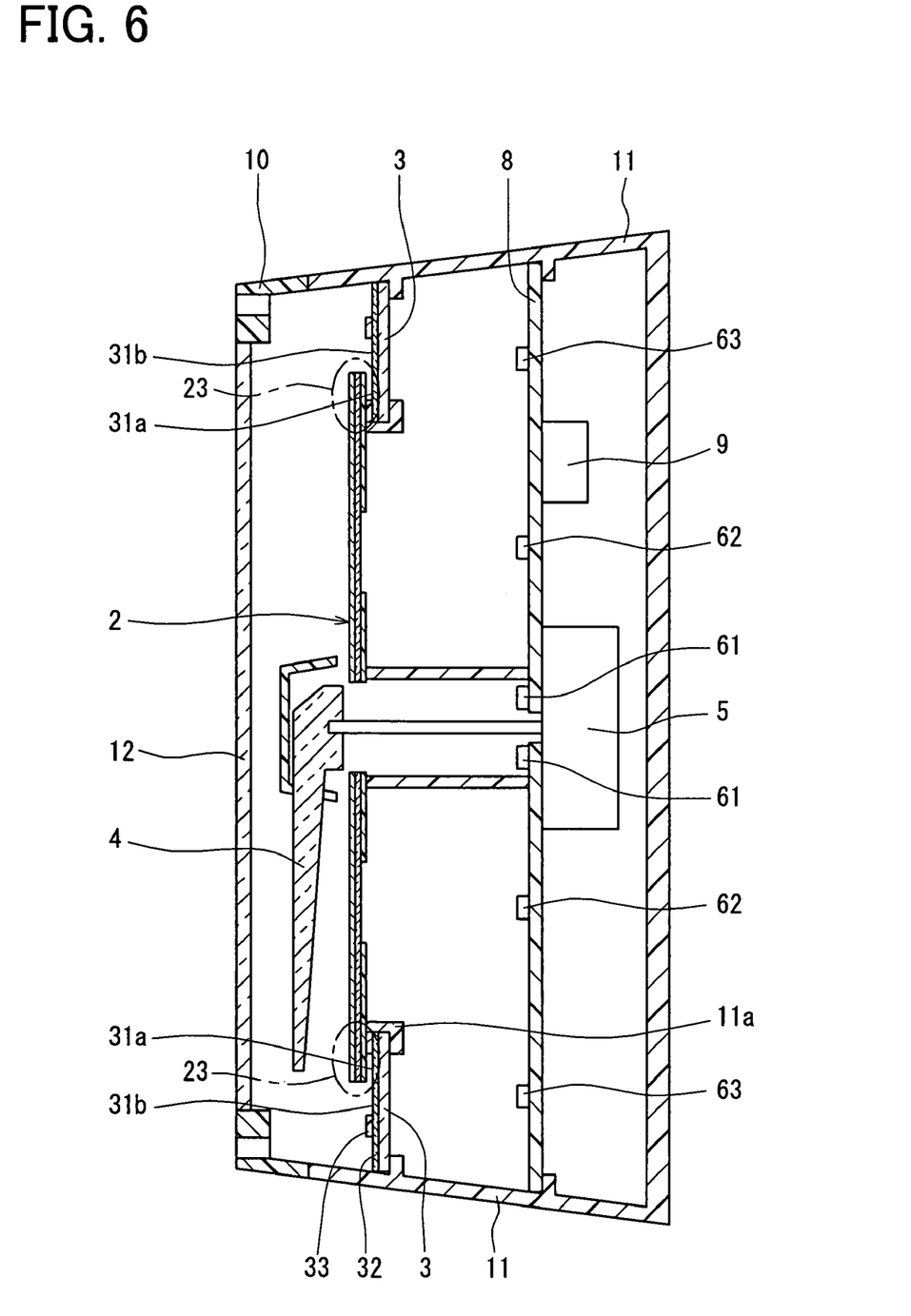
FIG. 6 is a cross-sectional view of a display device according to a second modification of FIG. 2.

FIG. 6 is a cross-sectional view showing a display device according to the second modification of FIG. 2.

In the second modification, as shown in FIG. 6, the scale ring 3 is formed into a plate shape without inclining relative to the dial plate 2 including the shield part 23, and the transparent part 25 is not formed in the dial plate 2 unlike the first modification.

Because the scale part 31 is not arranged to be inclined relative to the shield part 23, the sense of the depth in the change of the display of the scale part 31 is not available. However, both the sense of the spatial connection and the sense of the spatial expanse are available due to the change of the display of the scale part 31.

Figure 7:
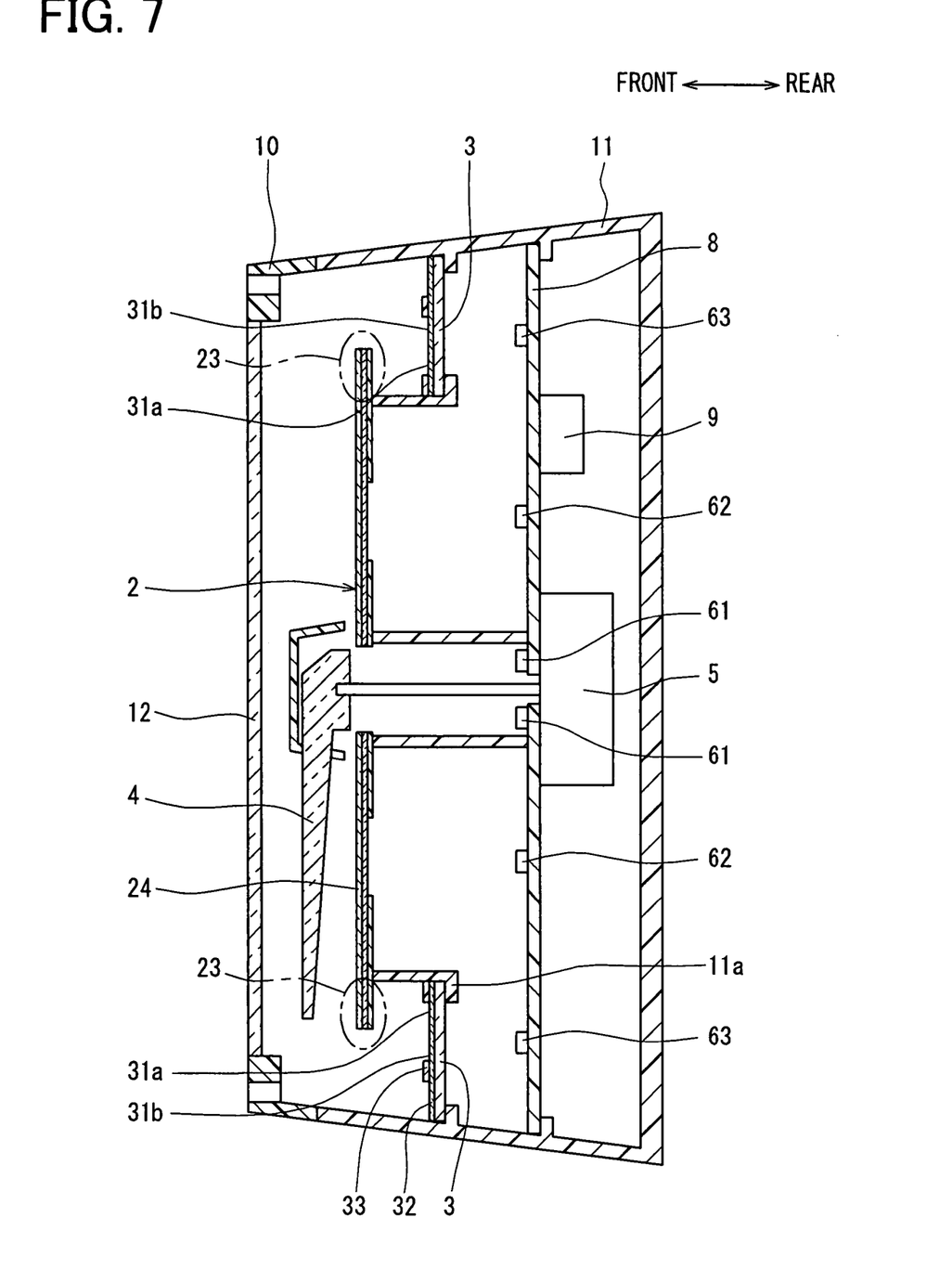
FIG. 7 is a cross-sectional view of a display device according to a third modification of FIG. 2.

FIG. 7 is a cross-sectional view showing a display device according to a third modification of FIG. 2.

In the third modification, the plate-shaped scale ring 3 is arranged at the rear side of the dial plate 2 including the shield part 23.

Therefore, in the third modification, the sense of the spatial expanse is higher than that in the second modification.

Figure 8:
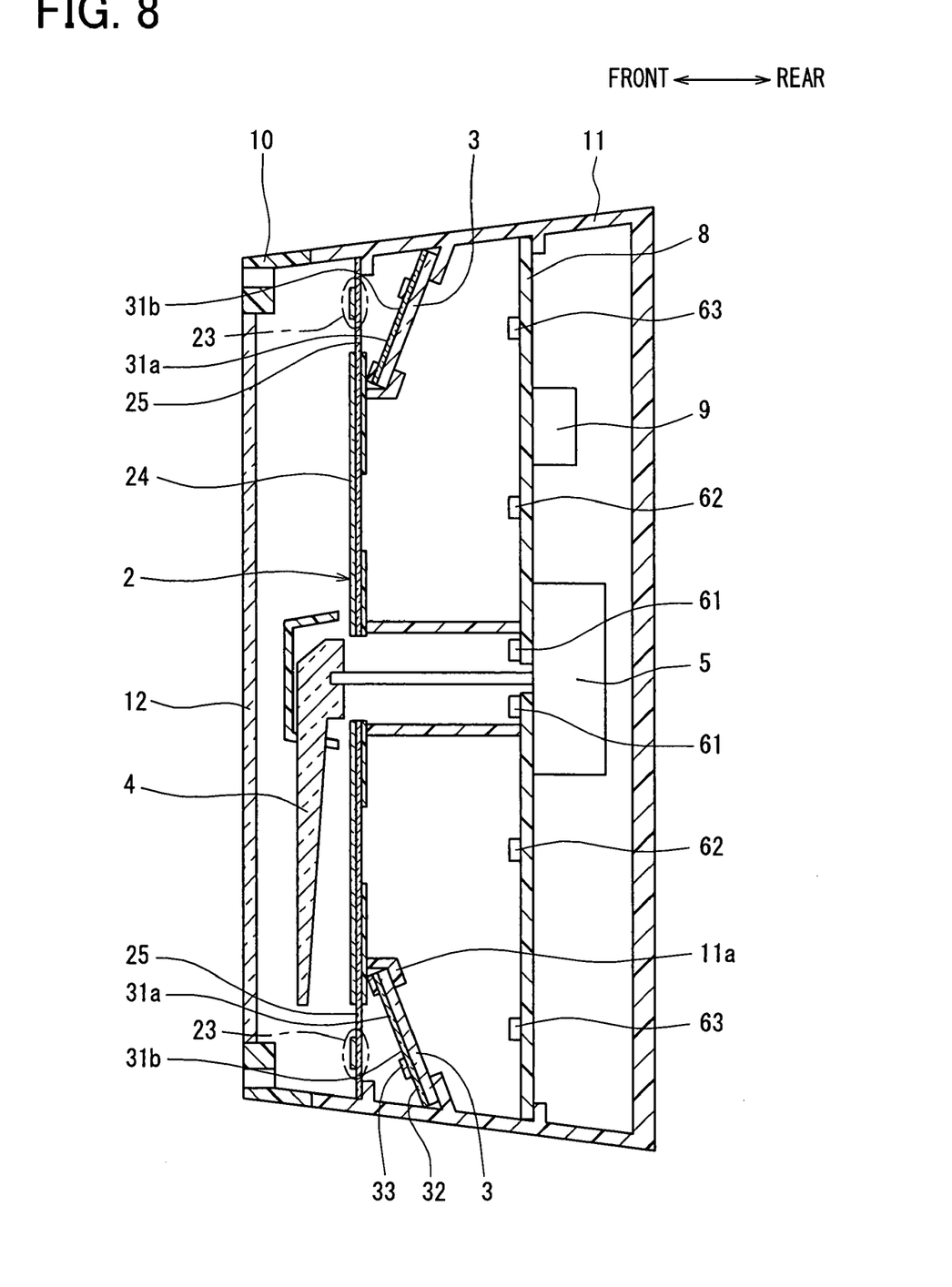
FIG. 8 is a cross-sectional view of a display device according to a fourth modification of FIG. 2.

FIG. 8 is a cross-sectional view showing a display device according to the fourth modification of FIG. 2.

Figure 9:
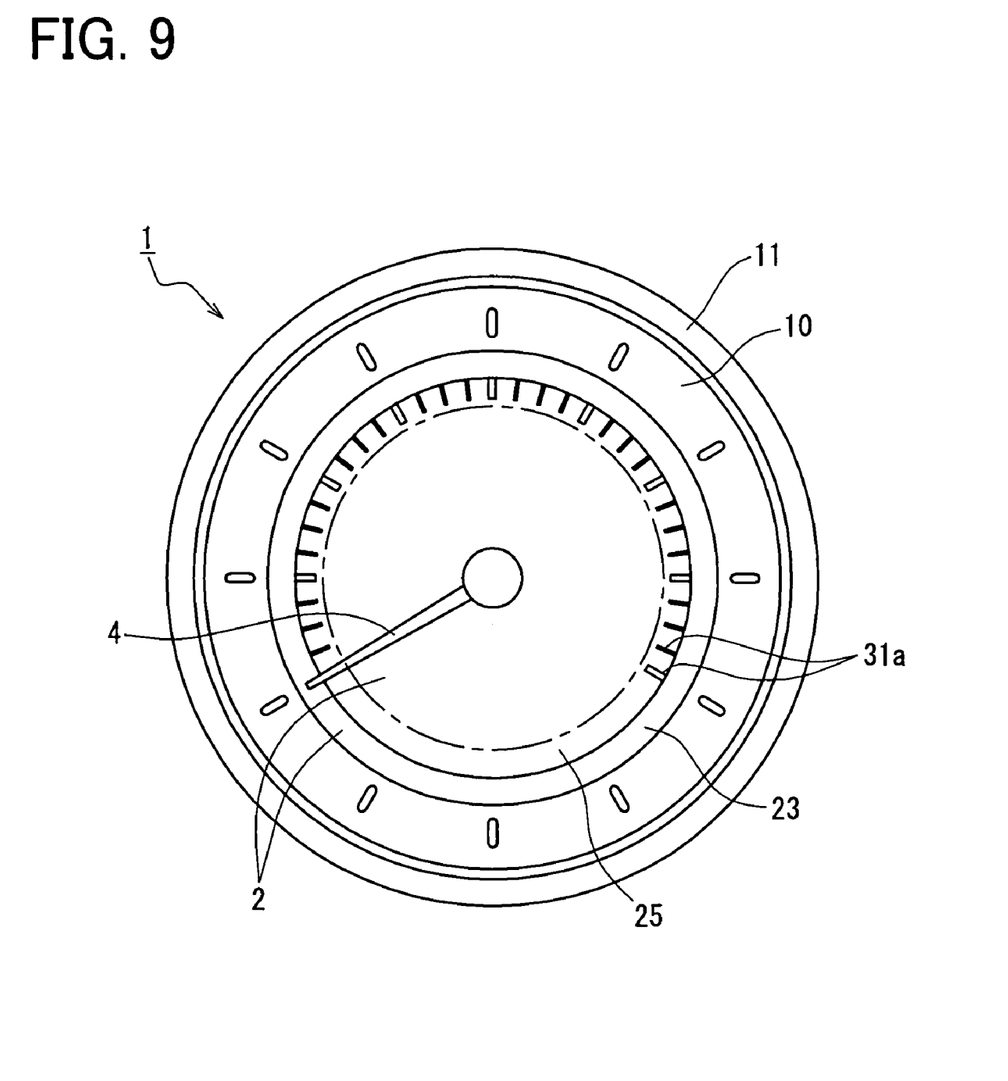
FIG. 9 is a front view of the combination meter of the fourth modification when the light emitting diodes do not emit light.

FIG. 9 is a front view of the combination meter 1 of the fourth modification when the light emitting diodes 62 and 63 do not emit light.

In the fourth modification, as shown in FIG. 8, the shield part 23 is arranged to shield not the first portion 31a of the scale part 31 (the inner peripheral region in FIG. 1 and the front side in the FIG. 8) but the second portion 31b of the scale part 31 (the outer peripheral region in FIG. 1 and the rear side in FIG. 8) unlike the above examples. In accordance with this, the transparent part 25 is arranged at the visual side of the first portion 31a of the scale part 31 (the front side in FIG. 8).

In addition, the plate-shaped scale ring 3 is inclined relative to the dial plate 2 so that the first portion 31a of the scale part 31 is arranged at the visual side (the front side in FIG. 8) of the second portion 31b of the scale part 31. The smoke layer 24 is formed so that the translucency thereof gradually increases at the region of the shield part 23 toward the inner peripheral direction, that is, from the side of the second portion 31b of the scale part 31 to the side of the first portion 31a and makes a gradation part.

In this way, by turning ignition switch 14 (the light emitting diode 63) from on to off, the combination meter 1 (display device) changes from the condition shown in FIG. 9 to the condition shown in FIG. 1. Thus, the scale part 31 can be looked to be extended and to disappear to an opposite direction described above, that is, from the inner peripheral side to the outer peripheral side.

In this way, above described effects are also obtained in the fourth modification.

In addition, a half mirror layer can be formed instead of the smoke layer 24 in the first modification to the fourth modification. The half mirror layer may be formed by a method such as printing from a material, for example, a material prepared by mixing a predetermined amount of aluminum powder having a predetermined particle size and particle shape to a translucent resin. In the first modification to the third modification, and like the case of the smoke layer 24, the half mirror layer may be formed so that the translucency thereof gradually increases at the region of the shield part 23 toward the outer peripheral direction, that is, from the side of the first portion 31a of the scale part 31 to the side of the second portion 31b of the scale part 31 and makes a gradation part.

On the other hand, in the fourth modification, the half mirror layer may be formed so that the translucency thereof gradually increases at the region of the shield part 23 toward the inner peripheral direction, that is, from the side of the second portion 31b of the scale part 31 to the side of the first portion 31a of the scale part 31 and makes a gradation part.

Although, in the above embodiment and modifications thereof, the combination meter 1 is the speed meter, it is not need to be limited. It is possible to replace or add other indicating instrument including a rotating meter.

Furthermore, the present invention can be used for a display device other than the combination meter 1.

Such changes and modifications are to be understood as being within the scope of the present invention as defined by the appended claims.

What is claimed is:

1. A display device comprising:
   a translucent member having a scale part;
   a light source disposed at a rear side of the translucent member; and
   a dial plate, that has a shield part located to shield a first portion of the scale part from a visual side so as to be invisible from the visual side when the light source is off,
   wherein the scale part has a second portion that is a residual portion of the first portion, and the second portion is visible from the visual side when the light source is off,
   wherein the shield part has a translucency so that the first portion of the scale part is visible through the shield part when the light source is on, and
   wherein each of the scales of the scale part continuously extends from the first portion of the scale part to the second portion of the scale part.

2. A display device comprising:
   a translucent member having a scale part;
   a light source disposed at a rear side of the translucent member; and
   a dial plate. that has a shield part located to shield a first portion of the scale part from a visual side so as to be invisible from the visual side when the light source is off,
   wherein the scale part has a second portion that is a residual portion of the first portion, and the second portion is visible from the visual side when the light source is off,
   wherein the shield part has a translucency so that the first portion of the scale part is visible through the shield part when the light source is on, and
   wherein the scale part is inclined relative to the shield part.

3. The display device according to claim 2, wherein the second portion of the scale part is arranged on the visual side than the first portion of the scale part.

4. The display device according to claim 3, wherein shield part includes a gradation part having a translucency gradually increases from a side of the first portion of the scale part to a side of the second portion of the scale part.

5. The display device according to claim 1, wherein the shield part is made of a material having a property of a smoky glass or a half mirror.

6. The display device according to claim 1, wherein the dial plate includes an aperture part or a transparent part to allow the second portion of the scale part to be visible from the visual side when the light source is off.

7. The display device according to claim 1, further comprising an indicator rotating along a front face of the dial meter on the visual side,
wherein the translucent member, the shield part and the scale part are provided along a rotation direction of an end of the indicator.

8. The display device according to claim 7, wherein the first portion of the scale part is arranged at an inner peripheral side of the second portion of the scale part.

9. The display device according to claim 7, wherein the first portion of the scale part is arranged at an outer peripheral side of the second portion of the scale part.

10. The display device according to claim 1, wherein the dial plate and the scale part are located to have a space therebetween.

11. The display device according to claim 10, wherein the scale part is located parallel to the dial plate.

12. The display device according to claim 2, wherein the shield part is made of a material having a property of a smoky glass or a half mirror.

13. The display device according to claim 2, wherein the dial plate includes an aperture part or a transparent part to allow the second portion of the scale part to be visible from the visual side when the light source is off.

14. The display device according to claim 2, further comprising an indicator rotating along a front face of the dial meter on the visual side,
wherein the translucent member, the shield part and the scale part are provided along a rotation direction of an end of the indicator.

* * * * *